United States Patent [19]

Turner

[11] 3,873,599

[45] Mar. 25, 1975

[54] DERIVATIVES OF GLYCYRRHETINIC ACID

[75] Inventor: John Cameron Turner, West Wickham, Kent, England

[73] Assignee: Biorex Laboratories Limited, London, England

[22] Filed: Sept. 6, 1973

[21] Appl. No.: 394,858

[30] Foreign Application Priority Data
Sept. 6, 1972 United Kingdom............ 41244/72

[52] U.S. Cl............ 260/468 K, 210/468.5, 424/305
[51] Int. Cl.............................................. C07c 69/74
[58] Field of Search...................... 260/468 K, 468.5

[56] References Cited
UNITED STATES PATENTS
3,452,078   6/1969   Turner et al..................... 260/468 S FOREIGN PATENTS OR APPLICATIONS
1,022,968   3/1966   United Kingdom........... 260/47 S

OTHER PUBLICATIONS

Segal et al., Biochemical Pharmacology, 19, 2501 (1970).

Primary Examiner—Robert Gerstl
Attorney, Agent, or Firm—Wenderoth, Lind & Ponack

[57] ABSTRACT

There are provided new cyclohexane-dicarboxylic acid derivatives of glycyrrhetinic acid which are useful for the treatment of inflammatory conditions.

10 Claims, No Drawings

NEW DERIVATIVES OF GLYCYRRHETINIC ACID

BACKGROUND OF THE INVENTION

A number of compounds are already known which can be used for the treatment of inflammatory conditions, including several derivatives of glycyrrhetinic acid. However, there is still a great need for new and more efficient compounds for the treatment of inflammatory conditions.

SUMMARY OF THE INVENTION

It is an object of the present invention to provide new derivatives of glycyrrhetinic acid which can be used for the treatment of inflammatory conditions in humans and animals.

The new derivatives of glycyrrhetinic acid according to the present invention are compounds of the general formula:

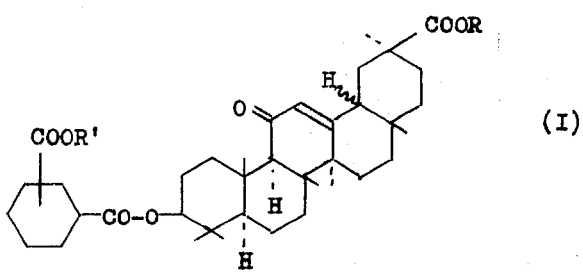

wherein R is a hydrogen atom or an alkyl radical and R' is also a hydrogen atom or an alkyl radical and the salts of those compounds in which R and/or R' is a hydrogen atom.

DETAILED DESCRIPTION OF THE INVENTION

Since the cyclohexyl radical in the new compounds of general formula (I) can be in the cis or trans form, it is to be understood that the present invention concerns these two isomeric forms, as well as isomeric mixtures thereof.

The alkyl radicals R and R' in the new compounds (I) preferably contain up to 6 carbon atoms and can be, for example, methyl, ethyl, n-propyl, isopropyl, butyl, pentyl or hexyl radicals.

For the preparation of the new compounds (I), glycyrrhetinic acid or an alkyl ester thereof is reacted with a cyclohexane-dicarboxylic acid or with a reactive derivative of a cyclohexane-dicarboxylic acid, for example, an acid halide or anhydride thereof.

The reaction can be carried out in an inert solvent, pyridine being preferred.

For the preparation of salts of compounds (I) in which R and/or R' is a hydrogen atom, the free acid compound is reacted in known manner with an appropriate inorganic or organic basic compound, for example, a basic alkali metal or alkaline earth metal compound, sodium hydroxide being preferred, or a non-toxic organic amine, for example, a mono-, di- or trialkylamine or a mono-, di-or trialkanolamine. This reaction is preferably carried out in the presence of an inert solvent in which the salt is insoluble or only sparingly soluble.

If desired, free carboxylic acid groups present in the products obtained can be esterified in known manner, preferably by reaction with an appropriate diazoalkane.

I have found that the new compounds according to the present invention possess valuable pharmaceutical properties and, in particular, have a good anti-inflammatory activity.

The following Examples are given for the purpose of illustrating the present invention:

EXAMPLE 1

A solution of 24 g. 18$\beta$-glycyrrhetinic acid and 10 g. cis-cyclohexane-1,2-dicarboxylic acid anhydride in 30 ml. dry pyridine was boiled under reflux for 2 hours. After cooling, the reaction mixture was diluted with 300 ml. acetone. 36 ml. concentrated hydrochloric acid and 95 ml. water were then added and the product was filtered off, washed with a small amount of 70 percent aqueous acetone and then with a copious amount of water and thereafter dried in a vacuum at 100°C. There were obtained 29.8 g. mono(3-glycyrrhetyl)-cis-cyclohexane-1,2-dicarboxylic acid; m.p. 288° - 290°C. (dec.); $[\alpha]_D^{24} = 118° \pm 2°$ ($c = 1$ percent in chloroform, containing 2 percent ethanol).

EXAMPLE 2

12.5 mono-(3-18$\beta$-glycyrrehetyl)-cis-cyclohexane-1,2-dicarboxylic acid were stirred with 30 ml. acetone to give a smooth paste. One equivalent of sodium hydroxide in 45 ml. water was slowly added, with stirring. Upon warming, a clear solution was obtained. 250 ml. hot acetone were added and the disodium salt was filtered off from the cooled solution and washed with 20 ml. 85 percent acetone and then with 100 ml. acetone. After drying in a vacuum at 100°C., there were obtained 11.8 g. of the disodium salt of mono-(3-18$\beta$-glycyrrhetyl)-cis-cyclohexane-1,2-dicarboxylic acid; $[\alpha]_D^{24} = + 124° \pm 2°$ ($c = 1$ percent in methanol"0.2 percent aqueous sodium carbonate solution (1:1).

EXAMPLE 3

A solution of 500 mg. mono-(3-18$\beta$-glycyrrhetyl)-cis-cyclohexane-1,2-dicarboxylic acid in chloroform was treated with an excess of an ethereal solution of diazomethane, whereafter the solution was evaporated to dryness. Crystallisation of the evaporation residue from acetone/ petroleum ether (b.p. 60° - 80°C.) gave crystalline needles of the dimethyl ester of mono-(3-glycyrrhetyl)-cis- cyclohexane-1,2-dicarboxylic acid; IR spectrum: 1620, 1660 cm$^{-1}$ (en-one), 1710, 1720, 1730 (ester carbonyls).

EXAMPLE 4

Example 1 was repeated but using trans-cyclohexane-1,2-dicarboxylic acid instead of the cis isomer. There was thus obtained mono-(3-18$\beta$-glycyrrhetyl)-trans-cyclohexane-1,2-dicarboxylic acid; m.p. 299° - 300°C. (dec.); $[\alpha]_D^{24} = + 115° + 2°$ ($c = 1$ percent in chloroform).

EXAMPLE 5

Example 3 was repeated but using mono-(3-18$\beta$-glycyrrhetyl)-trans-cyclohexane-1,2-dicarboxylic acid instead of the cis isomer. The product was crystallished from methanol. There was thus obtained the dimethyl ester of mono-(3-18$\beta$-glycyrrhetyl)-trans-cyclohexane-1,2-dicarboxylic acid; m.p. 160° - 165°C.

EXAMPLE 6

7 g. methyl glycyrrhetate and 3 g. trans-cyclohexane-1,2-dicarboxylic acid in 10 ml. pyridine were boiled under reflux for 2 hours. After cooling, the reaction mixture was diluted with 90 ml. acetone and 7 ml. hydrochloric acid and 30 ml. water added thereto. The product was filtered off, washed with 20 ml. of 60 percent aqueous acetone and then with a copious amount of water and thereafter dried in a vacuum at 100°C. There were obtained 8.4 g. mono-(methyl-3-glycyrrhetyl)-trans-cyclohexane-1,2-dicarboxylic acid; m.p. 243° – 244°C.

EXAMPLE 7

1 g. mono-(3-glycyrrhetyl)-trans-cyclohexane-1,2-dicarboxylic acid was dissolved in 2 ml. dichloromethane and 2 ml. n-hexanol and then diluted with 20 ml. n-hexanol containing 2 percent concentrated sulphuric acid. The reaction mixture was heated at 80°C. for 12 hours, whereafter 30 ml. petroleum ether were added and the solution was washed with water. The petroleum ether was evaporated to give a solution of the product in n-hexanol. This solution was then worked up chromatographically, using a silica gel plate and a mixture of n-butanol and ammonia (5:1) as developer. The product was extracted from the plate with a mixture of chloroform and methanol (2:1) and recrystallised from a mixture of acetone and petroleum ether. There was thus obtained the monohexyl ester of mono-(3-glycyrrhetyl)-trans-cyclohexane-1,2-dicarboxylic acid; m.p. 194°–195°C.

EXAMPLE 8 a. 15 g. trans-cyclohexane-1,4-dicarboxylic acid were heated under reflux with 150 ml. methanol containing 3 ml. concentrated sulphuric acid. The solution was concentrated to 30 ml. in a vacuum and 50 ml. water added thereto. The product was extracted with petroleum ether and the solution washed with water, dried over anhydrous sodium sulphate and evaporated. The residue was recrystallised from methanol to give 16 g. dimethyl transcyclohexane-1,4-dicarboxylate; m.p. 67° – 69°C.

b. 15.6 g. of the dimethyl ester obtained in a) were dissolved in 100 ml. methanol and 78.0 ml. 0.1N sodium hydroxide solution (i.e., sufficient to saponify half the ester groups) were added, whereafter the solution was warmed until the pH fell to 8.5. The resultant solution, which contained a mixture of diacid, monoester and diester, was evaporated to a small volume and extracted with petroleum ether to remove unhydrolysed diester (3.8 g.). The aqueous solution, containing the diacid and monoester as sodium salts, was diluted to 200 ml. with water, 30 ml. of methanol were added and then, while stirring, 50 ml. 0.1N sulphuric acid, i.e., sufficient to neutralise only part of the sodium salts present therein and to retain the more soluble diacid salt in solution, were added dropwise. The monester crystallised out in the form of needles, which were filtered off, washed and dried. There were obtained 6 g. of the monomethyl ester of trans-cyclohexane-1,4-dicarboxylic acid; m.p. 129° – 130° C.

c. 5.2 g. of the monomethyl ester obtained in b) were heated under reflux with 15 ml. thionyl chloride for 1 hour. Excess thionyl chloride was then boiled off and 10 ml. toluene added to the residue. The solution was evaporated to remove traces of thionyl chloride and the residue, which contained the acid chloride of the monomethyl ester of trans-cyclohexane-1,4-dicarboxylic acid, used directly for the next step.

d. The acid chloride produced in c) was boiled for 2 hours with 10 g. 18β-glycyrrhetinic acid and 30 ml. pyridine. 30 ml. methanol were added, together with sufficient chloroform to give a clear solution, and the solution was warmed to decompose unreacted acid chloride. A further 100 ml. chloroform were added and the solution obtained was washed with dilute hydrochloric acid and water, then dried with anhydrous sodium sulphate and evaporated to dryness. The residue was purified chromatographically, using chloroform/ether (3:1) as developer. The desired product was removed from the chromatographic plate used by extraction with chloroform/methanol. After removal of the solvent, the product obtained was recrystallised from ethyl acetate/petroleum ether. There was thus obtained the monomethyl ester of mono-(3-glycyrrhetyl)-trans-cyclohexane-1,4-dicarboxylic acid in the form of needles; m.p. 310° – 312°C.

EXAMPLE 9

50 mg. of the monomethyl ester of mono-(3-glycyrrhetyl)-trans-cyclohexane-1,4-dicarboxylic acid were heated at 60°C. for 1 hour with aqueous ethanol containing 5 percent potassium hydroxide. The reaction mixture was acidified with hydrochloric acid, diluted with water and the product filtered off, washed with water and dried. The product was recrystallised from acetone, with charcoal decolorisation, to give pure mono-(3-glycyrrhetyl)-trans-cyclohexane-1,4-dicarboxylic acid; m.p. 300° –305°C. (dec.).

The present invention also includes within its scope pharmaceutical compositions containing the new glycyrrhetinic acid derivatives. These pharmaceutical compositions can be administered orally, rectally or parenterally in admixture with a solid or liquid pharmaceutical carrier.

Solid compositions for oral administration include compressed tablets, pills, dispersible powders and granules. In such solid compositions, one of the new derivatives is admixed with at least one inert diluent, such as calcium carbonate, starch, alginic acid or lactose. Solid compositions for rectal administration can be made by mixing the active materials with conventional suppository bases. The solid compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavouring agents.

The compositions according to the present invention, for oral administration, include capsules of absorbable material, such as gelatine, containing one of the new derivatives, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilishing agents, by irradiation or by heating. They may also be produced in the form of sterile solid compositions, which can be dissolved in sterile water or some other sterile injectable medium immediately before use.

The percentage of active material in the compositions of the present invention may be varied, it being necessary that it should constitute a proportion such that a suitable dosage for the desired therapeutic effect shall be obtained. In general, the preparations of the present invention should be administered orally, rectally or parenterally to give 25 to 100 mg. of active substance per day. Parenteral administration can be, for example, by the intramuscular, intravenous or intrabursal routes.

The following Examples illustrate pharmaceutical compositions according to the present invention:

Example 10.
500 mg. tablets are prepared containing:-
the disodium salt of mono-(3-glycyrrhetyl)-
cis-cyclohexane-1,2-dicarboxylic acid      250 mg.
starch                                     150 mg.
lactose                                    95 mg.
magnesium stearate                         5 mg.

Example 11.
500 mg. tablets are prepared containing:-
mono-(3-glycyrrhetyl)-trans-cyclohexane-
1,4-dicarboxylic acid                      300 mg.
starch                                     180 mg.
magnesium stearate                         20 mg.

The compositions described in the two above Examples 10 and 11 are intended for oral administration to humans for the alleviation and treatment of inflammatory conditions.

I claim:
1. Compounds of the general formula:

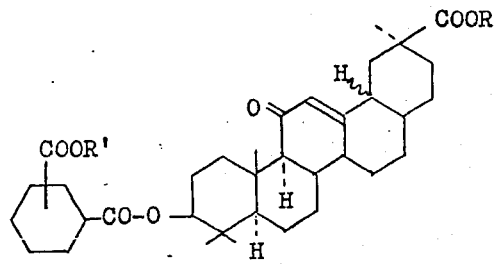

wherein R is a hydrogen atom or an alkyl radical containing up to 6 carbon atoms and R' is a hydrogen atom or an alkyl radical containing up to 6 carbon atoms and the salts of compounds in which R and/or R' is a hydrogen atom.

2. Mono-(3-glycyrrhetyl)-cis-cyclohexane-1,2-dicarboxylic acid.

3. The disodium salt of mono-(3-glycyrrhetyl)-cis-cyclohexane-1,2-dicarboxylic acid.

4. The dimethyl ester of mono-(3-glycyrrhetyl)-cis-cyclohexane-1,2-dicarboxylic acid.

5. Mono-(3-glycyrrhetyl)-trans-cyclohexane-1,2-dicarboxylic acid.

6. The dimethyl ester of mono-(3-glycyrrhetyl)-trans-cyclohexane-1,2-dicarboxylic acid.

7. Mono-(methyl-3-glycyrrhetyl)-trans-cyclohexane-1,2-dicarboxylic acid.

8. The monohexyl ester of mono-(3-glycyrrhetyl)-trans-cyclohexane-1,2-dicarboxylic acid.

9. The monomethyl ester of mon-(3-glycyrrhetyl)-trans-cyclohexane-1,4-dicarboxylic acid.

10. Mono-(3-glycyrrhetyl)-trans-cyclohexane-1,4-dicarboxylic acid.

* * * * *